No. 826,553. PATENTED JULY 24, 1906.
D. L. EUSTICE.
PACKING MACHINE.
APPLICATION FILED JULY 15, 1903.
3 SHEETS—SHEET 3.
Fig. 5.
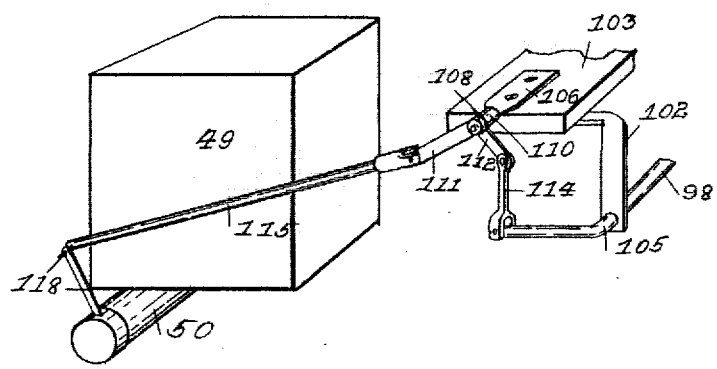
Fig. 9. Fig. 10.
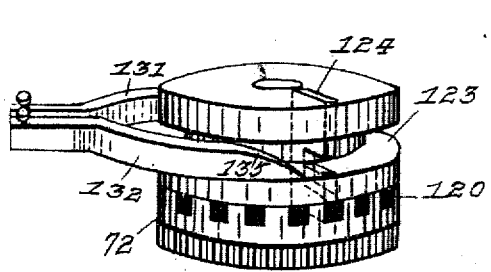 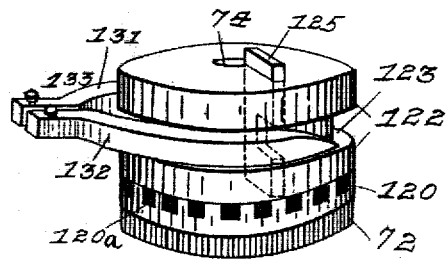
Fig. 6. Fig. 7.
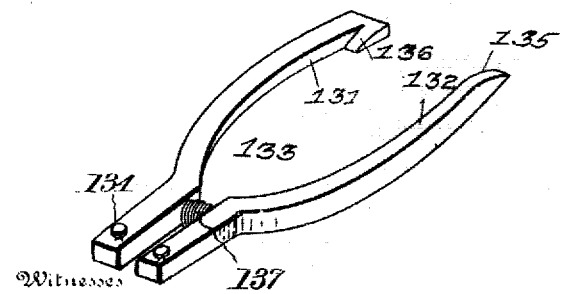 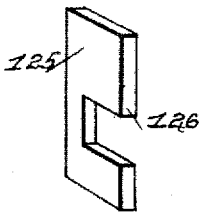
Witnesses
E. E. Cady
M. M. Brown
Inventor
Daniel L. Eustice
By M. M. Cady
Attorneys

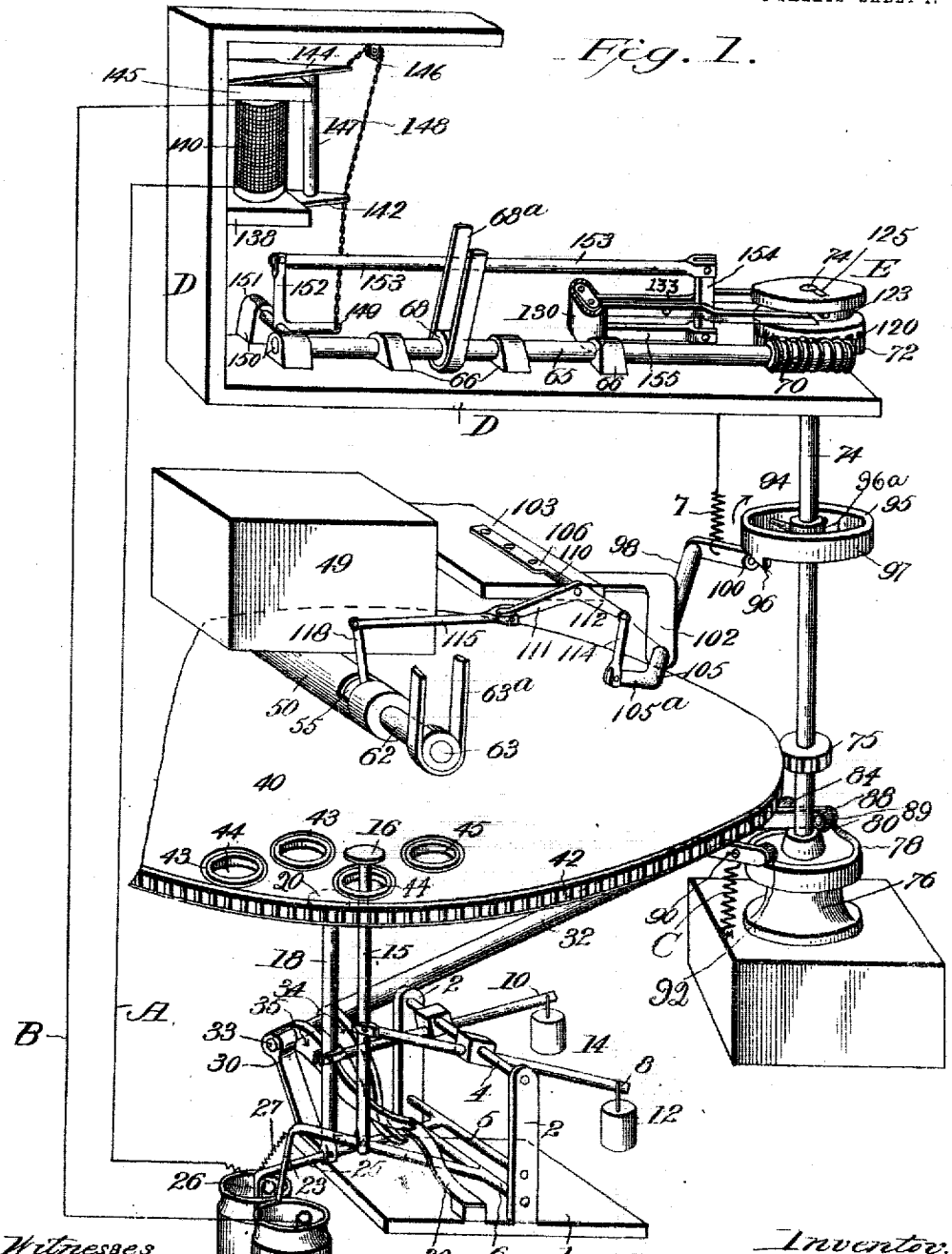

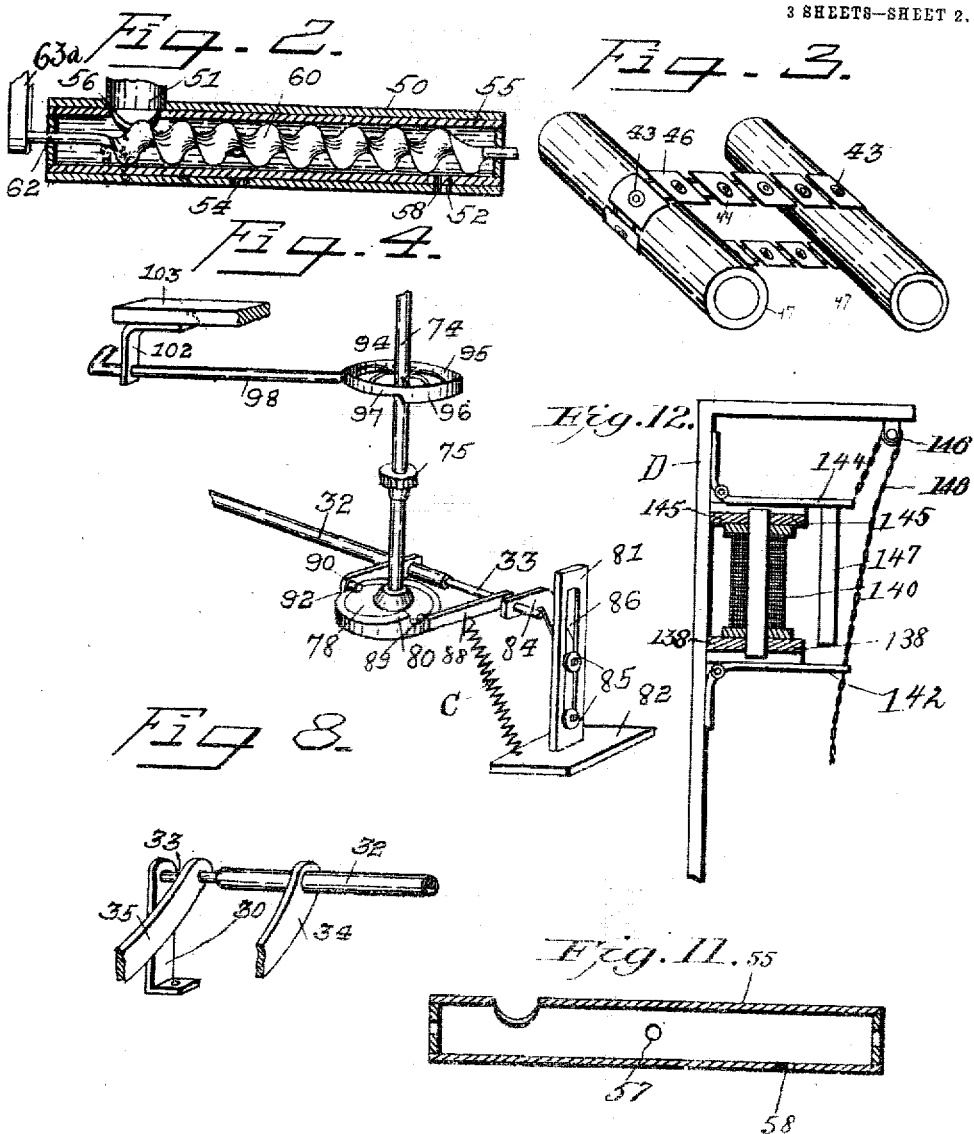

UNITED STATES PATENT OFFICE.

DANIEL L. EUSTICE, OF GALENA, ILLINOIS.

PACKING-MACHINE.

No. 826,553.   Specification of Letters Patent.   Patented July 24, 1906.

Application filed July 15, 1903. Serial No. 165,700.

*To all whom it may concern:*

Be it known that I, DANIEL L. EUSTICE, a citizen of the United States, residing in the city of Galena, in the county of Jo Daviess and State of Illinois, have invented certain new and useful Improvements in Packing-Machines; and I hereby declare the following to be a full, clear, and exact description of the invention, which will enable others skilled in the art to which it appertains to make and use the same.

This invention relates to a machine for automatically filling and weighing packages and is an improvement upon my Patents Nos. 682,608 and 720,907, issued September 17, 1901, and February 17, 1903, respectively.

The present invention embodies mechanism for automatically discharging the material to be filled into a can, case, or other receptacle, which is automatically weighed and conveyed away from the filling mechanism, thus insuring a uniform discharge and packing of material for each package. The material packed may be either in liquid or powdered form, such as axle-grease, cereals, sugar, salt, flour, &c.

The invention broadly consists in a traveling table onto which the packages to be filled are placed, a filling mechanism, a weighing mechanism, and a driving mechanism, the driving mechanism being arranged to operate all the aforementioned elements conjointly and in sequential order, there being means coöperating with the driving mechanism for controlling the discharge of the material and the operation of the weighing mechanism, and the weighing mechanism is arranged to operate an electrical device which controls the operation of the driving mechanism, wherefore the several mechanisms and parts constituting the means for positioning the empty packages in alinement to receive the material to be contained therein and then weighed and carried away from the filling mechanism are automatic in their operations.

For a full understanding of the construction, operations, merits, and advantages of my invention reference is to be had to the following description and the accompanying drawings, wherein—

Figure 1 is a perspective view of the machine complete. Fig. 2 is a longitudinal section of the filling mechanism. Fig. 3 is a view in perspective of a modified form of traveling table. Fig. 4 is a detail in perspective of the driving-shaft with the means for operating the weighing mechanism and the operating-lever for the filling mechanism shown in their relative positions with respect to the said driving-shaft. Fig. 5 is a view in perspective of another part of the means for operating the filling device with the filling-tube connected therewith. Fig. 6 is a perspective view of the clutch-levers of the clutch. Fig. 7 is a perspective view of the clutch-pin. Fig. 8 is a detail in perspective of a portion of the concentric shafts which operate the weighing mechanism, showing the manner of mounting them upon the base of the weighing mechanism. Fig. 9 is a perspective view of the clutch carried by the driving-shaft. Fig. 10 is a similar view of the clutch with the clutch-pin shown engaged with one arm of the clutch-lever and disengaged from one of the members thereof. Fig. 11 is a longitudinal vertical section of the inner tube of the filling mechanism, and Fig. 12 is a vertical section of the electromagnet and its mounting or supports.

Making renewed reference to the drawings, wherein similar reference notations indicate corresponding parts appearing in the several illustrations, 1 designates the base or support for the weighing mechanism. On this base are mounted two standards 2 2, in the upper ends of which is pivoted a rock-shaft 4, and near the lower ends thereof are pivoted two rods 5 and 6. Secured to the rock-shaft 4 are a pair of rods 8 and 10, having weights 12 and 14 suspended from the outer ends thereof. Pivoted to the inner ends of these rods are the platform-standards 15 and 18, each of which is provided with a platform 16 and 20 on the upper end thereof. The rod 5 constitutes a pivot for an arm 25, and the rod 6 constitutes a pivot for the arm 22, the ends of the arms 25 and 22 being provided with one of the electrodes, such as the carbon or zinc, of an electric battery, as represented at 23 and 26, and the ends of these arms are connected by a coil 27. The platform-standards 15 and 18 are connected at their lower end with these arms 25 and 22, which move therewith. The battery-jars are designated by 24 and 28 and have connected therewith suitable conductors A and B, as shown in Fig. 1.

The construction thus far described constitutes the weighing mechanism for the packages, and it is to be understood that certain details as to the mounting of the several parts may be varied at will and within the construction of an ordinary operative scale, so as to provide an efficient and sensitive weighing apparatus.

The means for operating the weighing mechanism comprises two concentric shafts 32 and 33, the former being tubular and inclosing the latter and having secured thereto at one end an arm 34 and at its other end an arm 90, while the latter has a similar arm 35 secured at one end and an arm 88 secured at its other end. This shaft 33 is journaled at one end in a standard 30, secured to the base 1 of the weighing mechanism, and the other end is journaled in an arm 84, adjustably mounted in a standard 81, as seen in Fig. 4. The standard 81 rises from a base 82 and is provided with a slot 86, into which a set-screw 85, screwed on the end of the arm 84, may be adjusted, this adjustment permitting the concentric shafts 32 and 33 to be raised or lowered and brought into operative relation with a plate 78, carried on the end of a drive-shaft 74, as will be more fully explained hereinafter. The edge of the plate 78 is provided with a projection 80, which is adapted to engage with the pins or rollers 89 and 92 on the ends of the arms 88 and 90, and when thus engaged the shafts 32 and 33 will be rocked axially and trip the arms 34 and 35 on the other ends thereof. When either of the pins 89 or 92 rides off of the projection 80, the arms of the shafts 32 and 33 drop down on the edge of the plate 78, and the weight of these arms, together with the weight of the arms 34 and 35, will be sufficient to reset the weighing mechanism—that is, engage with the arms 22 or 25 to lower the platforms 16 and 20; but if the weight of these elements is not sufficient to restore the platforms to their poising position after the package has been filled springs C C may be connected with the arms 88 and 90, as shown. The arm 35 on the end of the shaft 33 instead of engaging directly with the bar 22 may contact with a spring-arm 36, secured to the platform 1 and extending across and above the bar 22, so that the shaft 33 will have a yielding rocking motion when it operates to lower the platform 16 of the weighing mechanism.

The drive-shaft 74 is driven by a shaft 65, which is journaled in suitable bearings 66, secured to a base or shelf D at the top of the machine. On this shaft 65 is a pulley 68, which is connected with any source of power by a belt 68ª, and on the end of the shaft is a worm-screw 70, which meshes with a worm-gear 72, loosely mounted on the drive-shaft 74, but adapted to be keyed thereto by a clutch E, which will be hereinafter more fully described.

On the drive-shaft 74 above the plate 78 is a pinion 75, which meshes with the teeth 42 on the periphery of a rotary or traveling table 40. The table 40 is adapted to convey the packages and is provided with two circumferential rows of openings 44 and 45, the openings of one row being arranged in staggered relation with the openings of the other row and each opening preferably having annular grooves 43 therearound, the grooves serving as seats for the flange or projecting rim of the cans or packages, and thereby insuring a proper centering of the can over the openings, which as the table travels are brought into vertical alinement with the discharge-tube of the filling mechanism hereinafter to be described and which are also in vertical alinement with the platforms 16 and 20 of the weighing mechanism, so that the platforms may be projected through the openings above the table and elevate the package when it is to be filled.

The filling mechanism comprises a case or receptacle 49, which is mounted in any suitable manner above the table and into which the material to be packed is introduced. Connected to the bottom of the receptacle 49 is a vertical tube 51, the lower end of which fits into an opening 56 of a cylindrical casing or shell 50. (Shown in section in Fig. 2.) In the bottom of this casing 50 are two openings 52 and 54, from which the material is alternately discharged. Revolubly mounted within the casing 50 is a conveyer-tube 55, which is provided with two openings 57 and 58, arranged in vertical alinement with the openings 52 and 54 of the casing, but out of horizontal alinement with each other, so that when one of the openings 58 of the tube is in alinement with the opening 52 of the casing the other opening 57 of the tube will be out of alinement with the opening 54 of the casing, and vice versa, whereby when the material is discharged from the opening 52 the opening 54 will be closed. Journaled in the end plates of the tube 55 is a screw-conveyer shaft 62, having the usual screw 60 for advancing the material toward the discharge-openings, and on the end of this shaft 62 is a pulley 63, which is driven by a belt 63ª. The tube 55 has a limited axially oscillatory movement in the casing 50, and such movement may be imparted thereto by a series of links and levers which are operated by the drive-shaft. This operating mechanism consists of a link 115, one end of which is pivoted to an arm 118, which is secured to the tube 55 and extends through a slot in the casing 50, as shown in Fig. 1, and the other end is pivoted to one arm of a bell-crank lever 111, fulcrumed upon a bracket 110, which is mounted on a shelf or frame 103 of the machine. To the other arm of the bell-crank lever is pivoted a link 114, the lower end of which is in turn pivoted to the bent end 105ª of a rock-shaft 98, journaled in a hanger 102, which is also secured to the shelf 103 of the frame. The ends of the rock-shaft 98 are bent or disposed in opposite directions, so that the outer arm 100 projects toward the drive-shaft 74 and is engaged by a cam-wheel 95, mounted on said shaft. The lower edge of this cam-wheel is formed with a lug 96 and a recess or reëntrant portion 96$^a$, so that as the cam rotates with the drive-shaft the arm 100 of the rock-shaft 98 will be engaged alternately with the lug and the recess to bring the respective openings 57 and 58 of the filling-tube into alinement with the openings 52 and 54 of the casing, and during the time that the arm 100 is between the lug 96 and the recess 96$^a$ both of the openings 57 and 58 of the filling-tube will be out of alinement with the discharge-openings 52 54, so that the material is not wasted or spilled upon the table between the tripping of the arm 100.

From the description thus far given it will be seen that when the arm 100 is tripped by the lug 96 of the cam the arm 105$^a$ of the rock-shaft 98 will be elevated and turn the bell-crank lever 111, pulling the link 115 toward the drive-shaft and bringing the openings 54 and 57 into registering relation, thereby permitting the material to be discharged into a package which is supported on the platform 20 of the weighing mechanism, and during the filling operation the parts are at a standstill; but when the drive-shaft again starts the arm 100 is immediately disengaged from the lug 96 by means of the spring 7, which exerts an upward pressure thereon, and when thus disengaged the lever-and-link connections have been moved to rock the filling-tube 55, so as to bring the openings 54 and 57 out of registering relation; but the filling-tube has not rotated sufficiently to bring the openings 52 and 58 into registering relation. With the parts of the filling mechanism in these positions the drive-shaft rotates, and through the pinion 75 the table is advanced to bring the next can in vertical alinement with the discharge-opening 52 of the casing, and during this movement the arm 100 of the rock-shaft 98 is in engagement with the flat or level surface of the cam-wheel 95, but is permitted to again be tripped or drawn upwardly when the recess 96$^a$ comes into alinement with the end of the arm. It will be seen that this last tripping action of the arm 100 is upwardly in a direction opposite to that caused by the engagement of the lug 96, and therefore the lever-and-link connections are moved in an opposite direction, so as to continue the oscillation of the filling-tube and bring the opening 58 into alinement with the discharge-opening 52. The arm 100 remains seated in its recess during the filling operation; but it is dislodged therefrom as soon as the drive-shaft again rotates. It will be understood that these operations of the filling mechanism are synchronous with the operations of the weighing mechanism, as will be more fully set forth hereinafter, and the parts are shown in Fig. 1 in the positions they occupy when the package is being filled. It will also be seen that the means for operating the filling mechanism is actuated by the drive-shaft, that the mechanism for operating the weighing mechanism is actuated by the drive-shaft, and said filling mechanism and weighing mechanism may therefore be said to be controlled by the operation of the drive-shaft, and the present invention embodies in addition to there features means for automatically controlling the operation of the drive-shaft through the operation of the weighing mechanism, and such means will now be specifically set forth.

While the drive-shafts, through the medium of the concentric shafts 32 and 33 and their arms 34 and 35, operate to bring the weighing mechanism into operative relation with the filling mechanism, the filled package itself includes or constitutes part of the means for resetting the weighing mechanism and for controlling the operation of the drive-shaft. To this end the battery-jars 24 and 28 are electrically connected with an electromagnet 140 by means of the conductors A and B, and the electric connection is made and broken by the raising and lowering of the platforms of the weighing mechanism, since the lower end of each platform is connected with one of the electrodes, such as the zinc or carbon of the batteries, which when immersed into the solution contained in the battery-jar makes the circuit, and when the platform is elevated and the element withrawn from the solution the circuit is broken, and in Fig. 1 the platform 16 is shown raised and the circuit between the conductor B and the element 23 is broken, while the circuit between the elements 26 and the conductor A is made; but the circuit will not be closed to energize the magnet 140 until the weight of the package on the platform 16 counterbalances the weight 12, lowers the platform 16, and immerses the element 23 into the battery-jar.

The electromagnet 140 comprises the usual coil and core and is supported between two brackets 138 and 145, with the ends of the core projecting through openings in the brackets, the opposite outer faces of which are recessed so as to permit the swinging contact-plates 142 and 144 to engage with the core. These contact-plates preferably consist of two hinged leaves, one leaf of each plate being secured to the support D, as shown in Fig. 12, and near the end of the upper plate 144 is secured a rod 147, which extends downwardly and terminates short of the end of the plate 142 when the plates are out of contact; but when the electromagnet is energized by the operation above described the plate 142 will be attracted by the bar 147, carried by the plate 144, and the contact will be made, which will pull on the flexible connection 148, supported at its upper end by a pulley 146 and secured to the end of each plate. Thus the downward movement of the plate 144 will not only bring the rod 147 nearer the plate 142, but will also through the flexible connection draw the plate 142 upwardly, and thereby assist the contact.

Mounted in bearings 150 on the shelf D is a pintle 151, on which is secured an upstanding arm 152 and a horizontally-disposed arm 149, the latter being attached to the end of the flexible connection 148, so that when the plates 142 and 144 are attracted and the contact made the flexible connection 148 will draw up the arm 149 and rock it on its pivot, throwing the upright arm 152 rearwardly toward the upright portion of the support D. In the end of this upright arm 152 is secured a rod 153, which extends toward the clutch E and to end of which is secured a spreader-bar 154, the lower end of which is pivoted to an arm 155 or to any other suitable ear or bearing on the shelf D. The connections between the upright arm 152, the spreader-bar 154, and the rod 153 being jointed the bar 153 and the spreader-bar 154 will be moved rearwardly with the arm 152 when the magnet is energized, and this movement controls the operation of the clutch E, as will be now set forth.

The particular clutch which I employ for locking and unlocking the drive-shaft 74 and the shaft 65 is illustrated in detail in Figs. 9 and 10 and comprises an upper cylindrical element 122, which is keyed to the drive-shaft 74 and which is provided with a circumferential groove 123 and a transverse slot in which a key or pin 125 fits. The lower element 120 of the clutch is loose upon the shaft 74 and preferably consists of two disks, the lower one of which constitutes a worm-gear for the worm-shaft 70, while the upper disk, which is secured to the lower disk, has a series of notches or recesses 120ª, formed in its upper edge, the notched surface lying contiguous to the lower face of the disk 122, so that the pin 125 may drop into engagement with one of the notches and lock the lower geared element to the drive-shaft 74, as shown in Fig. 9. Coöperating with this clutch are a pair of clutch-levers 133, which are secured together near one end by a contractile spring 137, and the other ends of the levers project forwardly and outwardly to form a fork which straddles the member 122 of the clutch with the arms normally engaged within the groove 123. The arm 132 of the clutch-lever is beveled on its upper surface at its end, as at 135, and the end of the arm 131 is formed with an offset or inward projection which is beveled in an opposite direction, as at 136, so that the slot or recess 126 in the clutch-pin will be permitted to ride up the inclined beveled surface and onto the arms, and when thus elevated the clutch-pin will be disengaged from the notch of the loose member 120, and the drive-shaft 74 will then be disengaged from the power-shaft 65, since the member 120 will simply rotate upon the shaft 74 without imparting motion to the latter. The arms 131 and 132 of the lever are pivoted in a standard 130 at a point in the rear of the contractile spring 137, so as to permit the forked ends of the arms to be expanded against the action of the spring, the arms swinging horizontally, as will be clear from the illustration in Fig. 1, such spreading action emanating from the rearward movement of the spreader-bar 154, which bears upon the arms at the point where they merge outwardly, all of which will be more fully set forth in the statement of the operation.

The operation may be stated as follows: The operator may load the table with empty packages from one side thereof and at the same time remove the filled packages, and presuming the parts to be in the position indicated in Fig. 1 with the arm 88 of the shaft 33 in engagement with the lug 80 on the plate 78 and the arm 35 on the other end of the shaft disengaged from the bar 22, so that the platform is elevated through one of the openings 44 in the table, the drive-shaft 74 and the table 40 are at a standstill, but the arm 100 of the rock-shaft 98 is engaged with the lug 96 on the cam 95, so that one of the openings in the conveyer-tube is in alinement with one of the discharge-openings in the casing 50, and the material is being discharged into a package supported on the platform. During this filling operation the element 23, carried by the rod 22, is drawn out of the solution in the battery-jar and the circuit in the conductors A and B is broken, so that the magnet is deënergized and the clutch-levers are in engagement with the annular groove 123 in the clutch member 122, but the clutch-pin 125 has traveled up onto the arm 132 of the clutch-lever and disengaged the geared element 120 from the element 123. As soon as enough material has been discharged into the package to counterbalance the weight of the weighing mechanism the platform 16, with the package thereon, is lowered and the package becomes seated in the annular groove 43, which surrounds the opening in the table. As before stated, the continued downward movement of the platform is caused by the weight of the arms 35 and 88, augmented by the action of the spring C, and the arm 35, through the medium of the spring-arm 36, will immerse the element 23 into the battery-jar, thereby making the circuit in the conductors A and B and energizing the electromagnet 140, and the movements of its elements, through the flexible connection 148, will draw the bar 153 and the spreader-bar 154 rearwardly to spread the arms of the clutch-lever. As soon as the arms have been spread and the arm 132 disengaged from the notch in the clutch-pin the latter will drop into one of the notches in the element 120 and lock it to the drive-shaft 74, causing that element to rotate, which, through the pinion 75, will advance the table to bring the next can over one of the openings in the other row into alinement with the other discharge-opening in the casing 50. During the rotation of the shaft 74 the pin in the end of the arm 88 has become disengaged from the projection 80 of the plate 78, and this action took place upon the initial rotation of the shaft 74, which was practically instantaneous with the immersion of the element 23 into the battery-jar. When the projection 80 reaches the pin in the end of the arm 90, the shaft 32 is rocked and the arm 34 on the other end thereof is disengaged from the rod 25, so as to permit the platform 20, connected therewith, to be projected through one of the openings 45 to elevate the package over the same. Synchronously with the disengagement of the pin in the end of the arm 88 with the projection 80 the arm 100 of the rock-shaft 98 was also disengaged from the lug 96 of the cam 95, and the spring 7 moved the arm 100 upwardly to pull upon the link 115 and through its jointed connections rotated the conveyer-tube 55 sufficiently to cut off the discharge, and the discharge remains cut off during the rotation of the cam, which is engaged with the end of the arm 100. However, the notch or reëntrant portion 96ᵃ in the cam will permit the arm 100 to continue its upward movement when these two elements are in alinement, and the size of the cam and the plate 78 are such as to permit the projection 80 to be engaged with the pin in the end of the arm 90 when the reëntrant portion 96ᵃ is in alinement with the arm 100. With the parts in such positions the conveyer-tube has been rotated sufficiently to bring the other opening therein into alinement with one of the discharge-openings in the casing 50, and the material will be emptied into the package supported on the platform 20. During the rotation of the shaft 74 to bring the filling mechanism and the weighing mechanism into operative relation with each other the clutch-pin 125, which had been permitted to drop down into a notch in the element 120, was carried around with the rotary clutch, and when it reached the inclined face 136 on the offset end of the arm 131 of the clutch-lever the element 120 was again disengaged from the element 122 and the drive-shaft stopped. The filling operation continues, until the package contains enough material to counterbalance the weight 14 of the weighing mechanism, when the package will cause the platform 20 to descend and immerse the element 26 into the solution in the battery-jar 28, completing the circuit in the conductors A and B and again energizing the magnet, which, as before stated, operates the spreader-bar 154 to spread the arms of the clutch and permit the pin 125 thereof to again be engaged with one of the notches in the loose element 120.

It will be seen that the operation is continuous and that each package contains a uniform amount of material, which is automatically filled, weighed, and conveyed away from the filling mechanism.

Having now described my invention, what I claim is—

1. In a package-filling machine, a tank, a filling device consisting of a casing having openings, a tube in said casing provided with openings, a screw conveyer within the tube, means for rotating said screw conveyer, a traveling table, means for driving the table, means connected to the table-driving mechanism to oscillate the tube of the filling mechanism, and a weighing mechanism operated by the table-driving means.

2. In a package-filling machine, a tank, a casing connected therewith and having openings therein, a tube within the casing provided with openings adapted to register with the openings in the casing, means for operating the tube to open and close the openings in the casing, a weighing mechanism, means to actuate the mechanism and bring it into position to the table and the filling mechanism, and to restore the weighing mechanism to normal position.

3. In a package-filling machine, a traveling table provided with openings, a filling mechanism above the table, a weighing mechanism having a platform and also having means for raising the platform through the openings in the table, and means for lowering the platform below the table.

4. In a package-filling machine, a tank, a filling device, a traveling table provided with openings therethrough, means for advancing the table intermittently, a weighing machine having a platform attached thereto, said platform adapted to be raised and lowered through the openings in the table and sustain the package while it is being filled, and means to lower the platform below the table.

5. In a package-filling machine, a tank, a filling device having communication with the tank, a traveling table provided with holes therethrough and with means for determining the positions for setting the packages on the table, means for advancing the table intermittently, a weighing mechanism having a platform supported thereby, and means to raise and lower the platform through the openings in the table and sustain the package while it is being filled.

6. In a package-filling machine, a tank, a filling mechanism consisting of a casing having openings, a tube within the casing having openings, means for placing the openings in the casing and the tube in and out of registration, and a screw adapted to be rotated in the tube, in combination with means for sustaining the package while it is being filled, and a traveling table for removing the package from beneath the filling device after it is filled, and means for advancing the table.

7. In a package-filling machine, a tank, a filling device, means for operating the filling device to discharge the material into the package consisting of an arm attached to the filling device, a driving-shaft, a plate attached to the driving-shaft, and connection between the plate and the arm attached to the filling device and means connected with the plate for operating the arm of the filling device.

8. In a package-filling machine, a tank, a filling device to discharge the material into the package, a traveling table provided with openings therethrough, a weighing mechanism having a platform attached thereto and adapted to be raised and lowered through the openings in the table, means for advancing the table, and an electric device for starting and stopping the filling device and table.

9. In a package-filling machine, a tank, a filling mechanism to discharge the material into the package, a traveling table provided with openings therethrough, a weighing mechanism having a platform attached thereto and adapted to be raised and lowered through the openings in the table and raise and support the package while it is being filled, means for advancing the table and removing the package from beneath the filling device after it has been filled, and an electrical appliance for starting and stopping the table and the filling mechanism.

10. In a package-filling machine, a tank, a filling mechanism, a weighing mechanism, a traveling table having a gear, means for advancing the table consisting of a shaft provided with a gear adapted to engage the gear upon the table, a package-filling device, a cam-wheel on the said shaft to operate the filling device, and an electric appliance for controlling the movements of the mechanism for operating the table and the filling mechanism.

11. In a package-filling machine, a tank, a filling device consisting of a casing communicating with the tank and having openings and a tube within the casing provided with openings, a traveling table provided with openings therethrough, a weighing mechanism having a platform adapted to be raised and lowered through the openings in the table, a shaft provided with a gear adapted to engage the table to advance the same intermittently, and an electric appliance for controlling the movements of the table and the tube of the filling mechanism.

12. In a package-filling machine, a tank, a filling mechanism, a traveling table, a weighing mechanism, means for operating the filling and weighing mechanism and table consisting of a shaft provided with a plate, and connection with the table and filling mechanism, a worm-gear around the shaft, a worm-shaft engaging the gear, means for rotating the worm-shaft, and an electric appliance for connecting and disconnecting the gear with the shaft.

13. In a machine of the class described, the combination with a traveling table adapted to carry the packages to be filled, of means for driving the table, means coöperating with said driving means for controlling the discharge of the material into the packages, an electrically-operating device to control the operation of the driving means, and means controlled by the driving means to energize the electrically-operated device, substantially as specified.

14. In a machine of the class described, the combination with a traveling table, of means for driving the table, an electrically-operated device for controlling the operation of the driving means, and means operated by the driving means to energize the electrically-operated device.

15. In a machine of the class described, the combination with a traveling table adapted to carry several series of packages to be filled, and means for driving said table, of a filling device operated to alternately discharge the material into the several series of packages, said filling device being operated by the driving means for the table, and means for automatically stopping the table during the filling operation.

16. In a machine of the class described, the combination with a traveling table adapted to carry the packages to be filled, and means for driving said table, of a filling device operated by the table-driving means to discharge the material into the packages, means for automatically stopping the table during the filling operation, and means for automatically starting the table after a package has been filled.

17. In a machine of the class described, the combination of a filling device consisting of a casing having openings, a tube set in the casing and provided with openings adapted to be brought into registering relation with the openings in the casing, a screw conveyer within the tube, a traveling table to carry the packages to be filled, means for operating the filling mechanism and the table, means for automatically stopping the table during the filling operation, and a weighing mechanism automatically operated to start the table after a package has been filled.

18. In a machine of the class described, a traveling table to carry the packages, means for driving the table, a filling mechanism operated by the table-driving means to discharge the material into the packages, a weighing mechanism having a platform, means operated by the driving means for controlling the movement of the platform, and means controlled by the operation of the platform for stopping the table during the filling operation.

19. In a machine of the class described, the combination with a traveling table, of means for driving the table, a filling device operated by the table-driving means, a weighing mechanism having a platform, mechanism operated by the driving means to control the movement of the platform and permit the latter to be brought into operative position synchronously with the discharge of the material and also operating simultaneously with the aforementioned operations to control the operation of the driving means and stop the table during the filling operation.

20. In a machine of the class described, a traveling table, means for driving the table, a filling mechanism operated by the table-driving means, a weighing mechanism having a platform, mechanism operated by the driving means for bringing the platform into operative position, means for synchronizing the operation of the platform with the discharge of the material from the filling device, and means controlled by the operation of the platform to stop the table during the filling operation and start the same after the package has been filled.

21. In a machine of the class described, a traveling table, means for driving the table, a filling mechanism operated by the table-driving means, a weighing mechanism operated by the said driving means, an electrical device operated by the weighing mechanism for starting and stopping the driving means, said weighing mechanism operating simultaneously with the filling mechanism and the electrically-operated device for holding the table stationary during the filling operation.

22. In a machine of the class described, the combination with a traveling table and a filling device, of means for driving the table, means operated by the table-driving means for controlling the operation of the filling device, an electrically-operated device for controlling the operation of the driving means, and a weighing mechanism coöperating with the driving means to energize and deënergize the electrically-operated device.

23. In a machine of the class described, a traveling table, means for driving the table, a filling mechanism operated by the table-driving means, a weighing mechanism having a platform, mechanism operated by the driving means for bringing the platform into operative position, means for synchronizing the operation of the platform with the discharge of the material from the filling device, and an electromagnet energized and deënergized by the movements of the platform to stop the table during the filling operation and start the same after the package has been filled.

24. In a machine of the class described, the combination with a traveling table adapted to carry the packages to be filled, and means for driving said table, of a filling device operated by the table-driving means to discharge the material into the packages, means for automatically stopping the table during the filling operation, and a weighing mechanism to automatically start the table after a package has been filled.

25. In a package-filling machine, a traveling table with openings therein, a filling mechanism, a weighing mechanism provided with a platform adapted to be raised and lowered through the openings in the table, a driving means, and means connected with the driving means for forcing and holding down the platform after it has been partly lowered by the pressure of the filled can.

26. In a package-filling machine, a traveling table having openings therein, means for driving the table, a weighing mechanism having a platform adapted to be raised and lowered through the openings in the table, and means operated by the table-driving means to release the platform and permit it to be projected through the openings in the table, said means also adapted to coöperate to lower the platform, substantially as specified.

27. In a package-filling machine, a traveling table having openings therein, a driveshaft for moving the table, a weighing mechanism provided with a platform adapted to be raised and lowered through the openings in the table, means operated by the driveshaft to release the platform to permit it to be projected through said openings and elevate said package, said last-named means also adapted to reset the platform, substantially as specified.

28. In a package-filling machine, a traveling table having openings therein, a weighing mechanism provided with a platform and also provided with means to project the platform through an opening in the table and elevate the package while being filled, and means for forcing and holding down the platform after being partly lowered by the pressure of the filled package.

29. In a filling and weighing machine, a scale having a pan, means for depressing the scale-pan below the conveyer, a conveyer which carries the receptacle to a position above the scale-pan when the scale-pan is in its depressed position, means to raise the scale-pan into engagement with the receptacle and above the conveyer whereby the scale-pan lifts the receptacle off from the conveyer, and means for supplying material to the receptacle while on the scale-pan.

In testimony whereof I have signed my name to this specification in the presence of two subscribing witnesses.

DANIEL L. EUSTICE.

Witnesses:
FRANK T. SHEEAN,
HENRY D. SHEEAN.